US011688132B2

(12) United States Patent
Marder-Eppstein et al.

(10) Patent No.: US 11,688,132 B2
(45) Date of Patent: *Jun. 27, 2023

(54) POINT CLOUD DATA HIERARCHY

(71) Applicant: Willow Garage, LLC, San Francisco, CA (US)

(72) Inventors: Eitan Marder-Eppstein, San Francisco, CA (US); Stuart Glaser, San Francisco, CA (US); Wim Meeussen, Redwood City, CA (US)

(73) Assignee: Willow Garage, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,448

(22) Filed: Apr. 25, 2022

(65) Prior Publication Data

US 2022/0245893 A1    Aug. 4, 2022

Related U.S. Application Data

(63) Continuation of application No. 16/567,943, filed on Sep. 11, 2019, now Pat. No. 11,373,364, which is a (Continued)

(51) Int. Cl.
*G06T 17/00* (2006.01)
*G06T 15/20* (2011.01)
*G06T 15/10* (2011.01)

(52) U.S. Cl.
CPC ............ *G06T 17/005* (2013.01); *G06T 15/10* (2013.01); *G06T 15/20* (2013.01);
(Continued)

(58) Field of Classification Search
None
See application file for complete search history.

(56) References Cited

U.S. PATENT DOCUMENTS 8,014,568 B2    9/2011   Lojewski
8,443,301 B1    5/2013   Easterly et al.
(Continued)

OTHER PUBLICATIONS

Chun-Fa Chang, "LDI Tree: A Hierarchical Representation for Image-Based Rendering", ACM Press/Addison-Wesley Publishing Co. New York, NY, USA, 1999, (pp. 291-298).

*Primary Examiner* — Frank S Chen
(74) *Attorney, Agent, or Firm* — Stephen M. De Klerk

(57) ABSTRACT

One method embodiment comprises storing data on a storage system that is representative of a point cloud comprising a very large number of associated points; organizing the data into an octree hierarchy of data sectors, each of which is representative of one or more of the points at a given octree mesh resolution; receiving a command from a user of a user interface to present an image based at least in part upon a selected viewing perspective origin and vector; and assembling the image based at least in part upon the selected origin and vector, the image comprising a plurality of data sectors pulled from the octree hierarchy, the plurality of data sectors being assembled such that sectors representative of points closer to the selected viewing origin have a higher octree mesh resolution than that of sectors representative of points farther away from the selected viewing origin.

19 Claims, 22 Drawing Sheets

Related U.S. Application Data continuation of application No. 16/262,710, filed on Jan. 30, 2019, now abandoned, which is a continuation of application No. 16/014,266, filed on Jun. 21, 2018, now abandoned, which is a continuation of application No. 15/813,890, filed on Nov. 15, 2017, now abandoned, which is a continuation of application No. 15/486,172, filed on Apr. 12, 2017, now abandoned, which is a continuation of application No. 15/239,663, filed on Aug. 17, 2016, now abandoned, which is a continuation of application No. 14/718,594, filed on May 21, 2015, now abandoned, which is a continuation of application No. 13/789,554, filed on Mar. 7, 2013, now abandoned.

(60) Provisional application No. 61/607,833, filed on Mar. 7, 2012.

(52) U.S. Cl.
CPC .................. *G06T 2207/10028* (2013.01); *G06T 2210/36* (2013.01); *G06T 2210/56* (2013.01)

(56) References Cited

U.S. PATENT DOCUMENTS

| | | |
|---|---|---|
| 8,525,848 B2 | 9/2013 | Janson |
| 2002/0075311 A1 | 6/2002 | Orbanes et al. |
| 2005/0285858 A1* | 12/2005 | Yang .................. G06T 15/08 |
| | | 345/420 |
| 2006/0058985 A1 | 3/2006 | Arslan et al. |
| 2008/0238919 A1 | 10/2008 | Pack |
| 2010/0077311 A1 | 3/2010 | Santoro et al. |
| 2010/0182323 A1 | 7/2010 | Nuydens |
| 2011/0066963 A1 | 3/2011 | Schrag et al. |
| 2014/0267348 A1 | 9/2014 | Gontmakher et al. |
| 2014/0293266 A1 | 10/2014 | Hsu et al. |
| 2016/0275216 A1 | 9/2016 | Chen et al. |

* cited by examiner

POINT CLOUD DATA HIERARCHY

RELATED APPLICATION DATA

The present application is a continuation of U.S. patent application Ser. No. 16/567,943, filed on Sep. 11, 2019, which is a continuation of U.S. patent application Ser. No. 16/262,710, filed on Jan. 30, 2019, which is a continuation of U.S. patent application Ser. No. 16/014,266, filed on Jun. 21, 2018 now abandoned, which is a continuation of U.S. patent application Ser. No. 15/813,890, filed on Nov. 15, 2017 now abandoned, which is a continuation of U.S. patent application Ser. No. 15/486,172, filed on Apr. 12, 2017 now abandoned, which is a continuation of U.S. patent application Ser. No. 15/239,663, filed on Aug. 17, 2016 now abandoned, which is a continuation of U.S. patent application Ser. No. 14/718,594 filed on May 21, 2015 now abandoned, which is a continuation of U.S. patent application Ser. No. 13/789,554 filed on Mar. 7, 2013 now abandoned, which claims the benefit under 35 U.S.C. § 119 to U.S. Provisional Application Ser. No. 61/607,833 filed Mar. 7, 2012. The foregoing applications are hereby incorporated by reference into the present application in their entirety.

FIELD OF THE INVENTION

The present invention relates generally to point cloud processing, storage, and image construction systems and techniques, and more particularly to configurations for efficiently presenting images to an operator using one or more point subsets taken from a point cloud comprising a very large number of points.

BACKGROUND

The collection of very large point clouds has become somewhat conventional given modern scanning hardware, such as the Hi-definition LIDAR systems available from Velodyne corporation of Morgan Hill, Calif., under the tradename HDL-64E™. Such systems may be coupled to vehicles such as automobiles or airplanes to create very large point datasets (i.e., in the range of billions of points or more) that can become quite unruly to process, even with modern computing equipment, due to limitations in componentry such as main computer memory. Indeed, notwithstanding current efforts to gather point cloud data to, for example, create a detailed national topography database, the processing and sharing of such data remains a challenge due to the sheer size and file structure of the point clouds. For example, if the U.S. government creates a detailed point cloud over a particular county in one state using fly-over LIDAR, and a researcher or agency desires to analyze this data and conventional techniques to determine how many stop signs are on roads within the county, such analysis will present not only a data collaboration problem, but also a storage and processing challenge even if a clear algorithm is identified for detecting a stop sign automatically based upon a particular portion of the subject point cloud. One solution to at least some of the data sharing challenges remains to ship a hard drive from one party to another if the data fits on a hard drive, but this is obviously suboptimal relative to what the users would do with two connected client systems if they had the ability to share the dataset as if it was a much smaller dataset. Another challenge, of course, is in the processing of what likely is a relatively large point cloud with conventionally-available computing power (i.e., such as that typically available to a consumer or engineer). There is a need for streamlined solutions for storing, processing, and collaborating using very large point cloud datasets.

SUMMARY

One embodiment is directed to a method for presenting multi-resolution views of a very large point data set, comprising: storing data on a storage system that is representative of a point cloud comprising a very large number of associated points; organizing the data into an octree hierarchy of data sectors, each of which is representative of one or more of the points at a given octree mesh resolution; receiving a command from a user of a user interface to present an image based at least in part upon a selected viewing perspective origin and vector; and assembling the image based at least in part upon the selected origin and vector, the image comprising a plurality of data sectors pulled from the octree hierarchy, the plurality of data sectors being assembled such that sectors representative of points closer to the selected viewing origin have a higher octree mesh resolution than that of sectors representative of points farther away from the selected viewing origin. Storing may comprise accessing a storage cluster. The method further may comprise using a network to intercouple the storage system, controller, and user interface. At least one portion of the network may be accessible to the internet. The method further may comprise generating the user interface with a computing system that houses the controller. The method further may comprise presenting the user interface to the user within a web browser. The user interface may be configured such that the user may adjust the selected origin and vector using an input device, causing the controller to assemble a new image based at least in part upon the adjusted origin and vector. The very large number of associated points may be greater than 1 billion points. The point cloud may have a uniform point pitch. The point cloud may have a point pitch that is less than about one meter. The point cloud may have a point pitch that is less than about 1 centimeter. The point cloud may represent data that has been collected based upon distance measurement scans of objects. The point cloud may be representative of at least one LIDAR scan. The octree hierarchy of data sectors may be configured such that an N level sector represents a centroid of points at the N+1 level below. Each point may be weighted equally in determining the centroid. The points comprising the point cloud may not all be weighted equally in determining the centroid. The method further may comprise using the controller to store data sectors of similar octree mesh resolution in similar accessibility configurations on the storage system. The controller may be configured to store data sectors of similar octree mesh resolution on a common storage device. The controller may be configured to store data sectors of similar octree mesh resolution such that they have similar retrieval latencies from the storage system. The image may comprise a gradient of octree mesh resolution data sectors in a direction outward from the selected viewing origin.

DETAILED DESCRIPTION

Figure 1A:
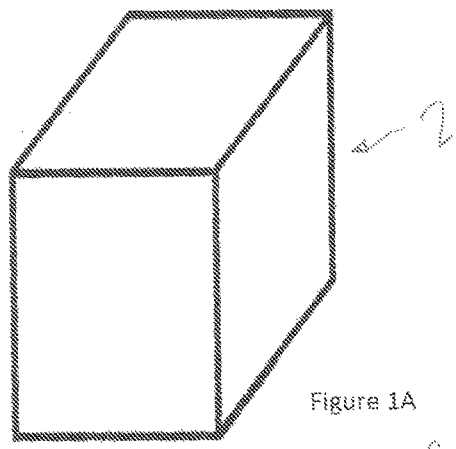
FIGS. 1A-1C illustrate an octree breakdown of a given volume of points in space.
Figure 1B:
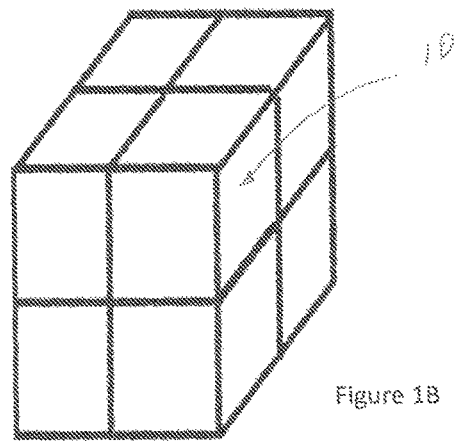
Figure 1C:
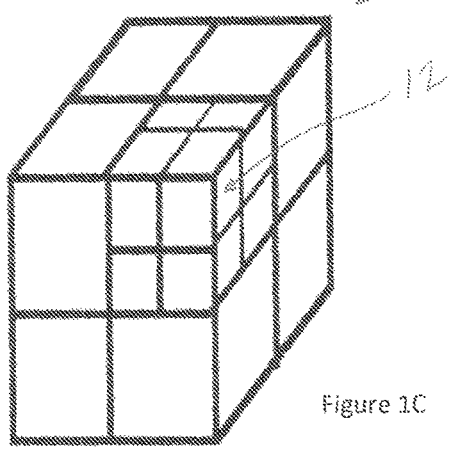
Figure 2A:
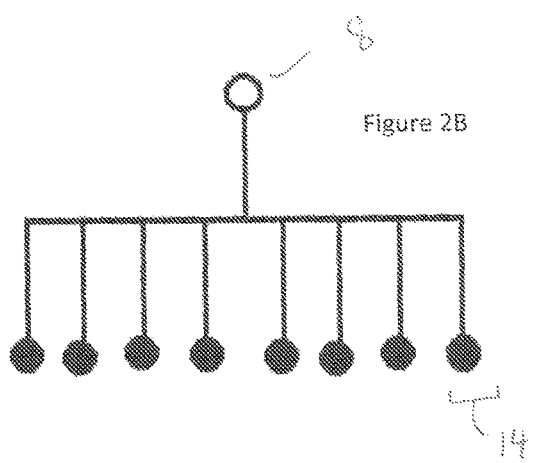
FIGS. 2A-2C illustrate a two-dimensional analogy to the breakdown depicted in FIGS. 1A-1C.
Figure 2B:
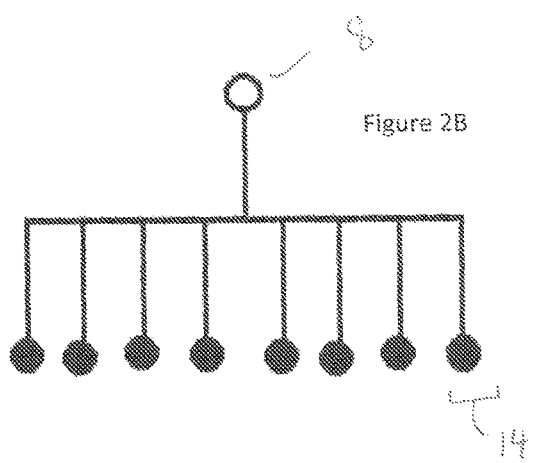
Figure 2C:
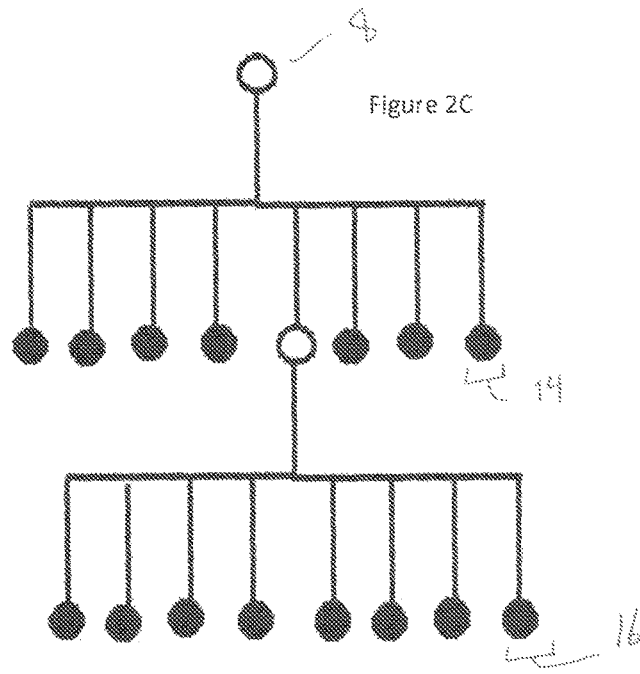

One of the important ingredients to facilitating efficient storing, processing, and collaborating using very large point cloud datasets is some kind of organizational data structure configuration, because handling all of the data in the global data set at maximum resolution would likely overburden available computing resources. Referring to FIGS. 1A-1C, the notion of creating an octree volume splitting hierarchy is depicted, starting with a single volume box (2) in FIG. 1A that may be representative of a large number of points contained within the box. For example, in one embodiment, the box may be characterized by a weighted or unweighted average, or centroid, of the points contained within the box. The resultant single master point (8) may be represented in a point based illustration as shown in FIG. 2A. Progressing to FIGS. 1B and 2B, each time two or more points fall within the same box, the volume may be subdivided 8 times (in an "octree" format), to yield eight smaller boxes (10), each of which may also be represented as a point, as in FIG. 2B (14), which may be representative of all of the points contained within the pertinent box (10). FIGS. 1C and 2C illustrate yet another level down an octree hierarchy, wherein the same qualifying analysis may be repeated (each time two or more points fall within the same box, the volume may be subdivided 8 times) to yield another subdivision into smaller boxes (12) and representative points (16). With such a configuration, subdivision is more limited in locations of the point cloud with only sparse population of points; it is not useful to subdivide, store, and recall a bunch of empty points or empty boxes. Thus a sparse data structure may be created using such hierarchical processing.

Figure 3:
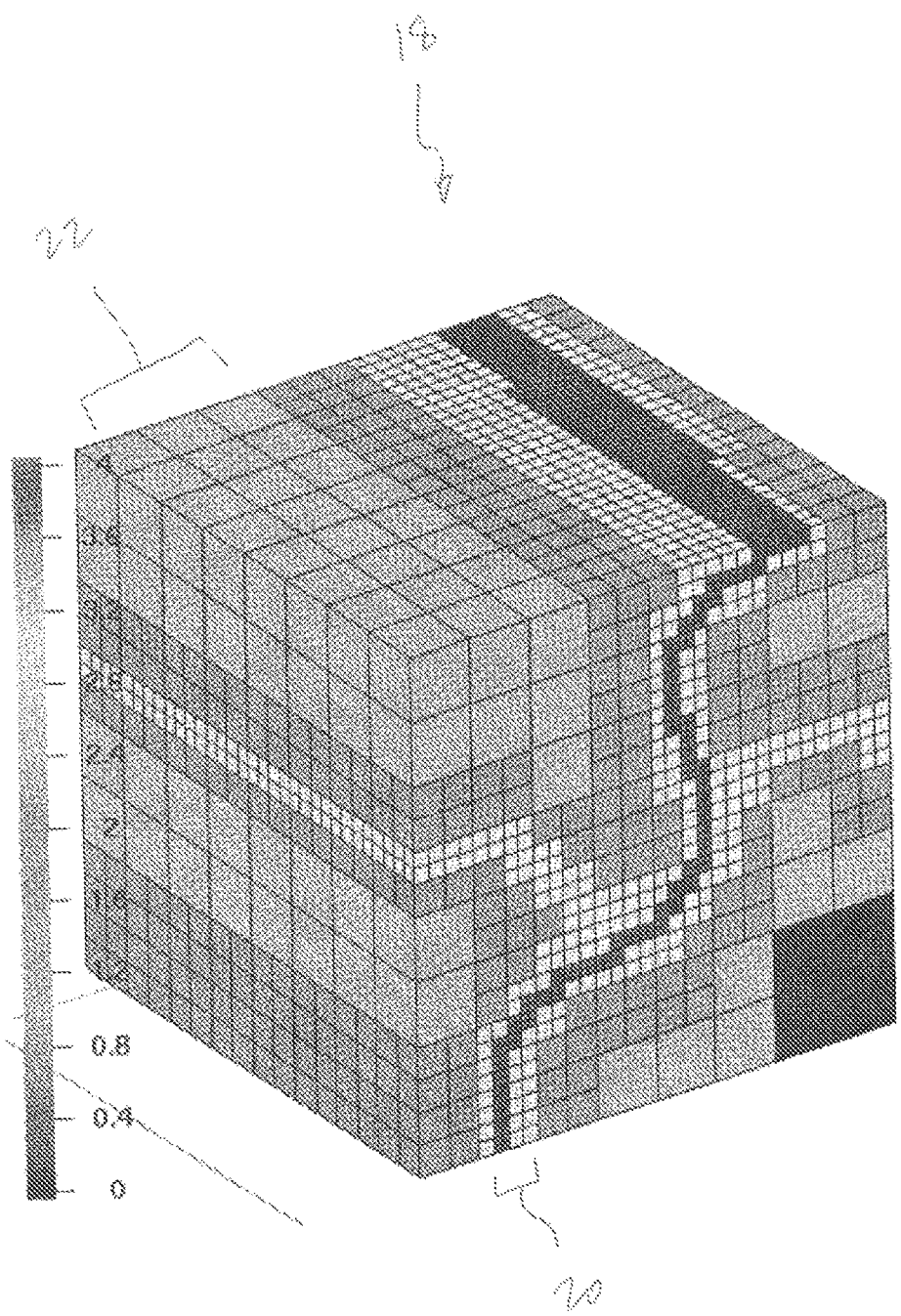
FIG. 3 illustrates an application of an octree for characterizing points within a cloud that are pertinent to seismic geological activity.

Referring to FIG. 3, a volume of points is represented with an octree hierarchical breakdown of the points in the cloud that comprise the three-dimensional data stack, which may be representative of seismic or geological datapoints within a volume of earth, for example. Portions of the subject overall volume (18) with fewer points, such as the sub-volume depicted to the upper left (22), which may be representative of relatively homogeneous geographic material, for example, have not been broken down to the same hierarchy level, or "mesh resolution" level, as portions (20) which contain a greater number of points. The resultant data hierarchy is more efficient than one that would result from characterizing each portion of the overall volume (18) at the same mesh resolution regardless of the point distribution within the pertinent point cloud.

Figure 4:
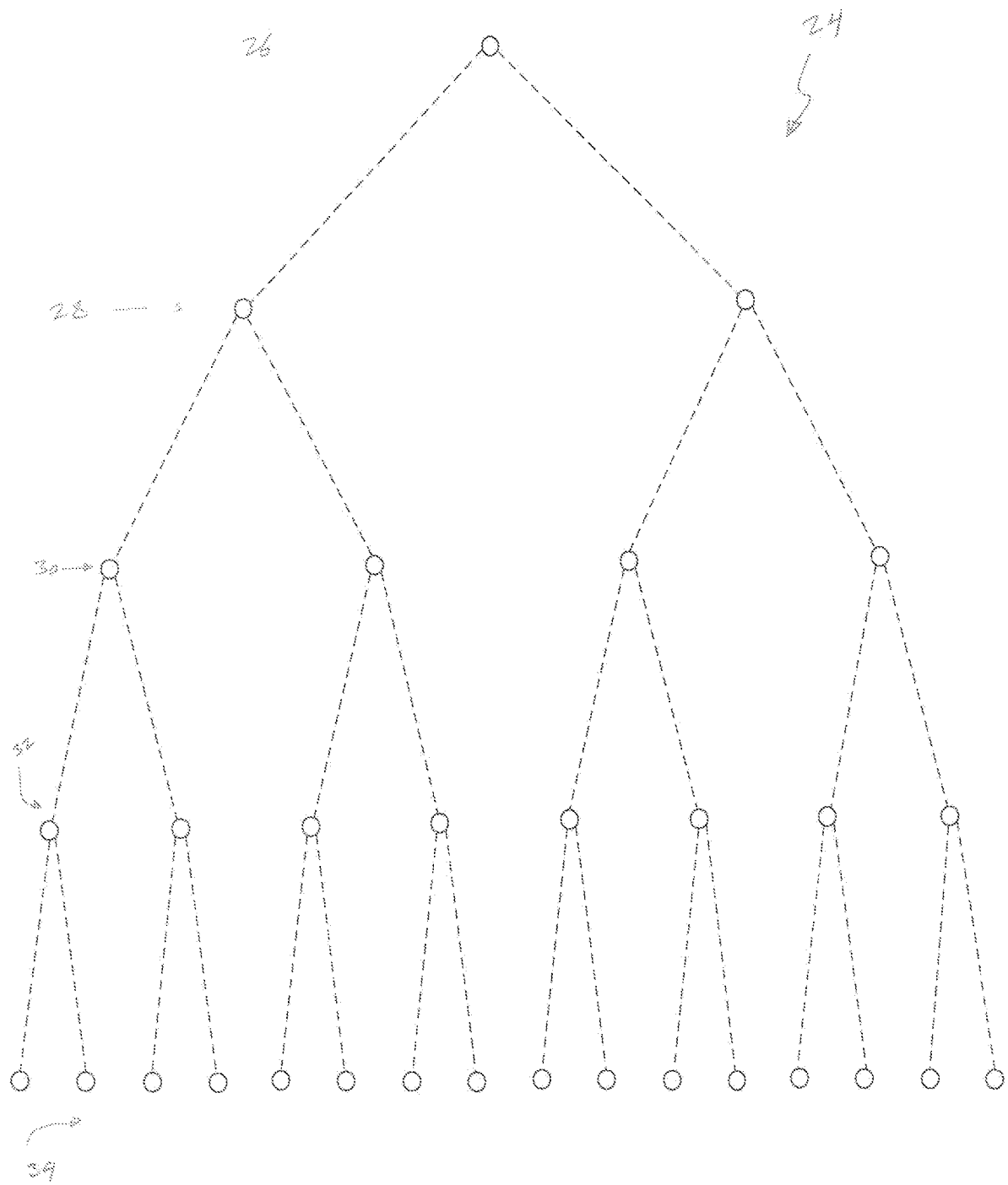
FIG. 4 depicts a binary analogy to an octree hierarchy, the binary model being more convenient for illustrative purposes.
Figure 5:
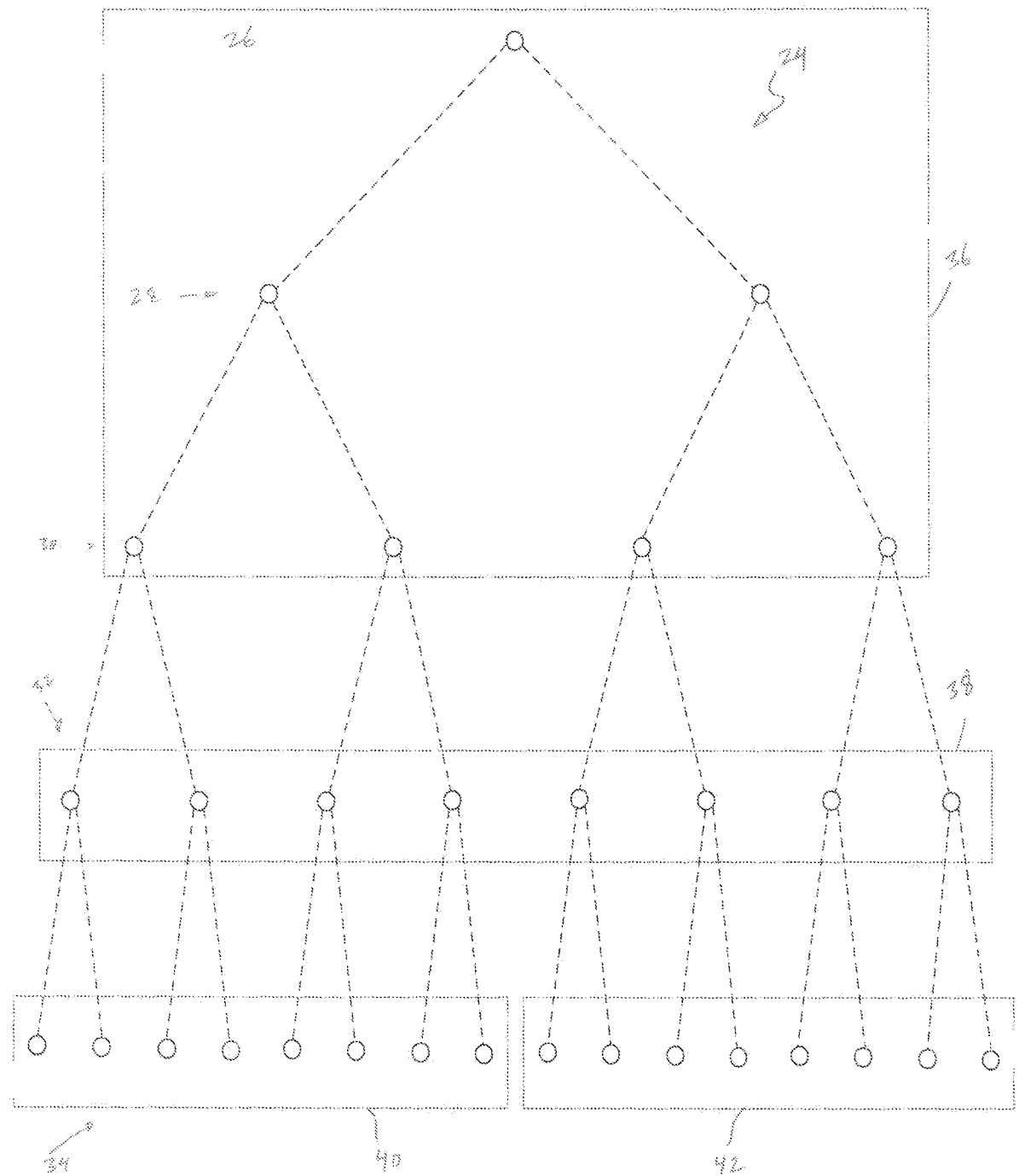
FIG. 5 depicts breakdown of a point cloud hierarchy into data sectors of approximately 8 nodes each.
Figure 6:
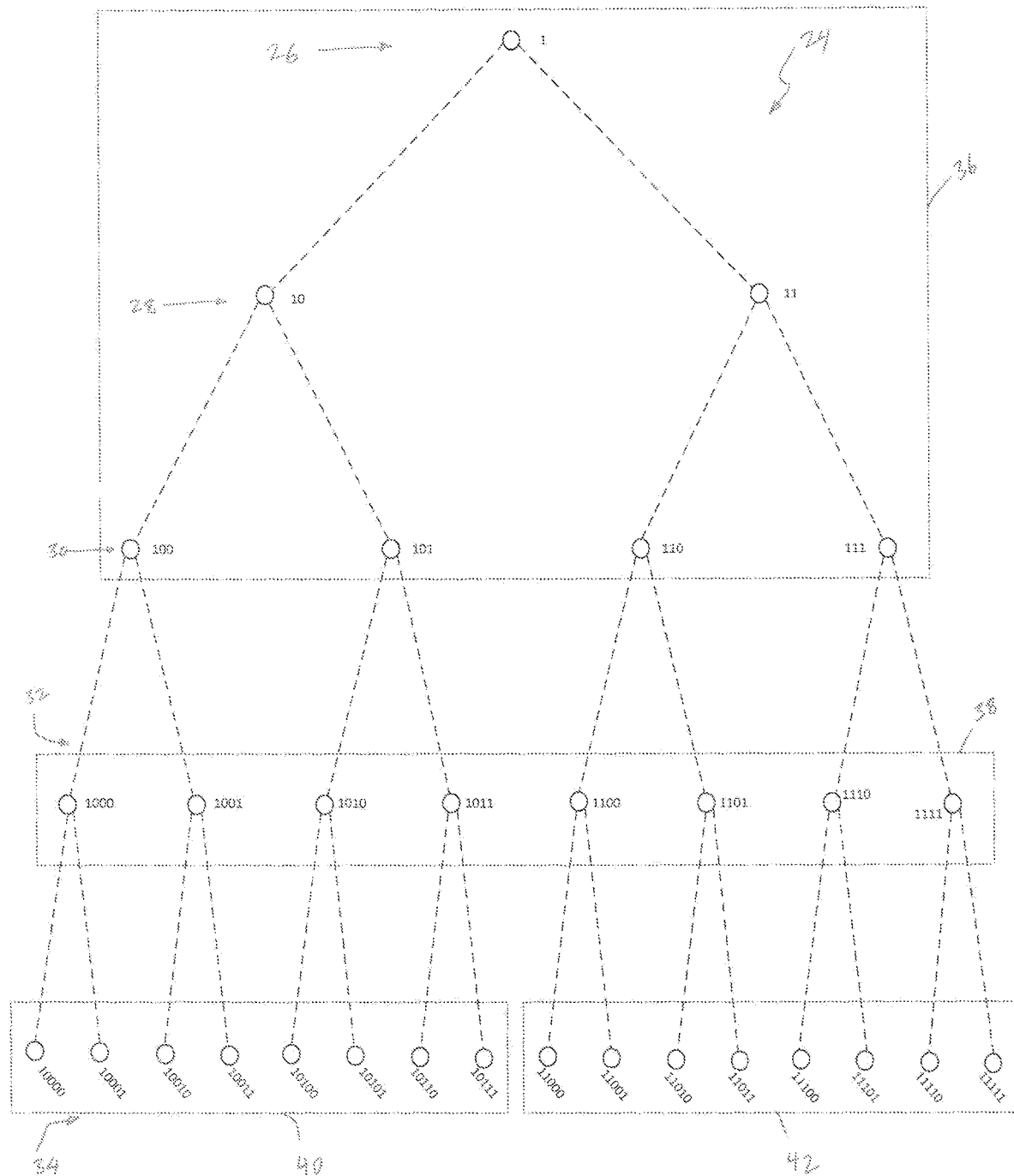
FIG. 6 depicts a deterministic naming configuration that may be applied to name each of the data sectors in a particular hierarchy.

Referring to FIGS. 4-6, for simplicity of illustration, rather than showing an octree subdivision hierarchy, a binary subdivision hierarchy (i.e., subdivision into two sub-points for each parent point, as opposed to eight sub-points for each parent point with an octree solution) is depicted. Referring to FIG. 4, at the top level (26), all of the points from other levels below (28, 30, 32, 34) are represented, such as by a weighted or unweighted average. For illustrative simplicity, in the first five levels of the depicted binary tree (24), the data of the pertinent cloud remains dense enough to continue subdivision as shown (i.e., with each subdivision, there were at least two points being represented by a parent point;
 presumably with further succession of the hierarchy, some sparse areas would develop wherein the subdivision need not be continued beyond a certain level, and therefore the tree need not be maximally dense, as shown).

Referring to FIG. 5, in one embodiment, a given hierarchy may be subdivided into data sectors or "chunks" (36, 38, 40, 42) that may be stored together on a particular storage device or devices. In the depicted embodiment the top level data sector represents the top three levels (26, 28, 30) and the top 7 points in the hierarchy (24), and the remaining data sectors (38, 40, 42) represent groups of 8 points. The width or number of points within each data sector represents the maximum width of a hierarchy tree stack that is selected to be stored as a unit, and this selection generally may be determined more as a function of how much data can be loaded into memory than it is a function of storage device (hard drive, etc) size. In one embodiment, the maximum number of points that may be represented within a sector is about 8 to the 6th power. In practice, it is preferable to have less than about 1,000 points in an octree sector or file, and due to the sparseness of typical hierarchy buildout through large clouds of data, one will end up with between about 100 and about 10,000 points in each sector or file—or on average about 1,000 points, depending upon what portion of the point cloud is being examined.

Referring to FIG. 6, a tree configuration (24) similar to that shown in FIG. 5 is depicted, with the addition of a point labeling scheme that may be automated. For example, in one embodiment, a simple deterministic naming scheme may involve naming the first level (26) master point "1", and then as the tree is built out, turns to the left add a "0" to the end of the name, and turns to the right add a "1" to the end of the name. The associated data sectors (36, 38, 40, 42) may be named using the lower-leftmost point in one embodiment, so that the top sector is named "100", and the rightmost level 5 (34) sector is named "11000". Such a fully deterministic naming configuration may be generated along with the portions of the tree structure, and may be utilized later for the quick retrieval of given data sectors. In one embodiment, data sectors that are geometrically adjacent to one another within the tree structure are stored as close to each other on the physical storage device or devices as possible, to enable fast retrieval (preferably with similar storage retrieval latency) of sectors which may be nearby one another as viewed by a user who is assembling one or more views from adjacent portions of the hierarchy.

To produce a view or composite image from the point cloud for a user, the user typically first must provide some information regarding the data "frustrum" of interest, or the data that he intends to be within the simulated field of view, which may be defined by a point origin within or outside of the point cloud, a vector originating at the point origin and having a three-dimensional vector orientation, and a field capture width (somewhat akin to an illumination beam width when a flashlight is shined into the dark: the field capture width is like the beam width in that it defines what may be seen by the operator in the images; it may have a cross-sectional shape, or "field capture shape" shape, that is substantially circular, oval, binocular, rectangular, etc). In one embodiment, significant speed of retrieval and processing efficiencies may be obtained by producing hybrid resolution, or multi-resolution images or views for a user that comprise assemblies of portions of the data cloud at resolutions that increase as the sectors get closer to the origin defined for the particular view being assembled. For example, in one embodiment, if a user has a point cloud that is representative of a deep forest of many trees, and the user selects an origin, vector, and field capture width and shape to provide him with a certain view of the forest, it generally is much more efficient to provide the sectors most immediate to the selected viewpoint at a higher resolution (i.e., down the data hierarchy) than for the sectors farthest away from the selected viewpoint. In other words, if the trees in the front of the view are going to block the trees to the extreme back anyway, why bring in the maximum resolution representation of the trees in the back, only to have visibility of them blocked anyway—so a lower resolution representation of these trees to the extreme back may be assembled. In one embodiment a resolution gradient may be selected to tune the difference in resolution of elements in the extreme back of the view versus the extreme close; further, the gradient may be tuned to have linear change in resolution from back to front, nonlinear, stepwise at certain distance thresholds, and the like. In one embodiment gradient variables may be tunable by an operator depending upon computing and bandwidth resources as well.

Figure 7:
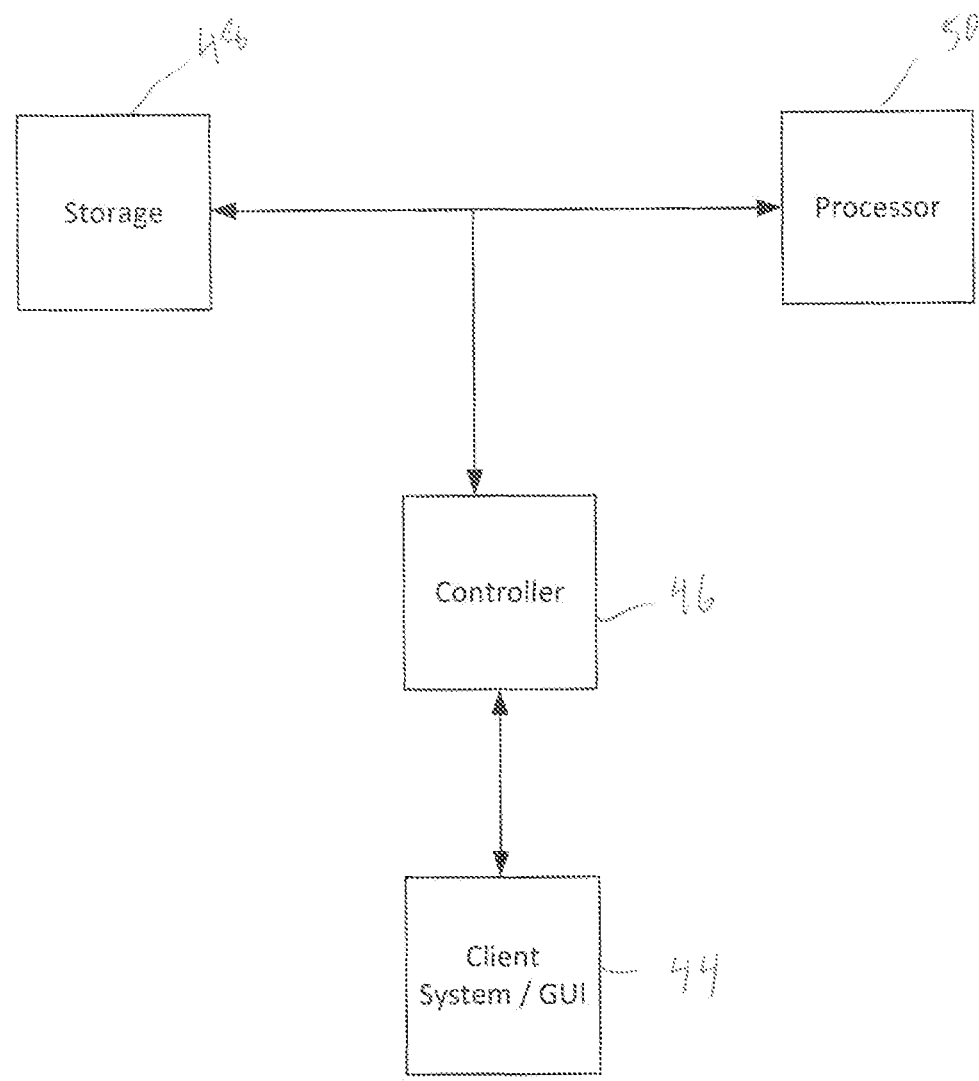
FIG. 7 depicts one embodiment of a processing/storage configuration that may be utilized by one or more users on client systems.
Figure 8:
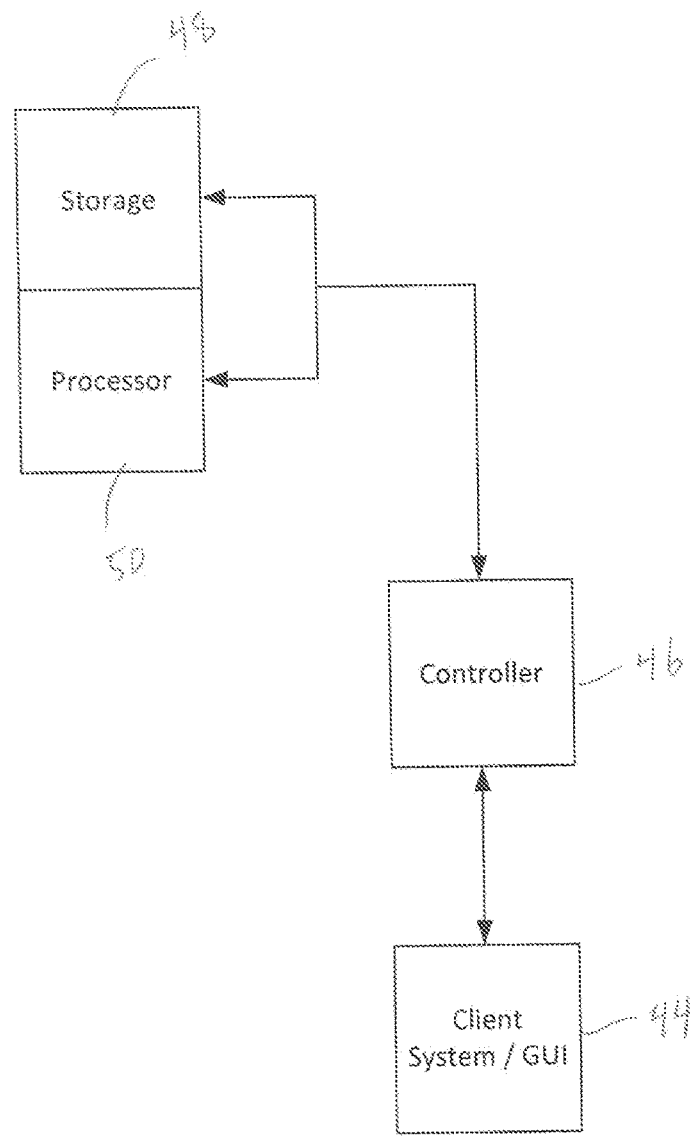
FIG. 8 depicts another embodiment of a processing/storage configuration that may be utilized by one or more users on client systems.
Figure 9:
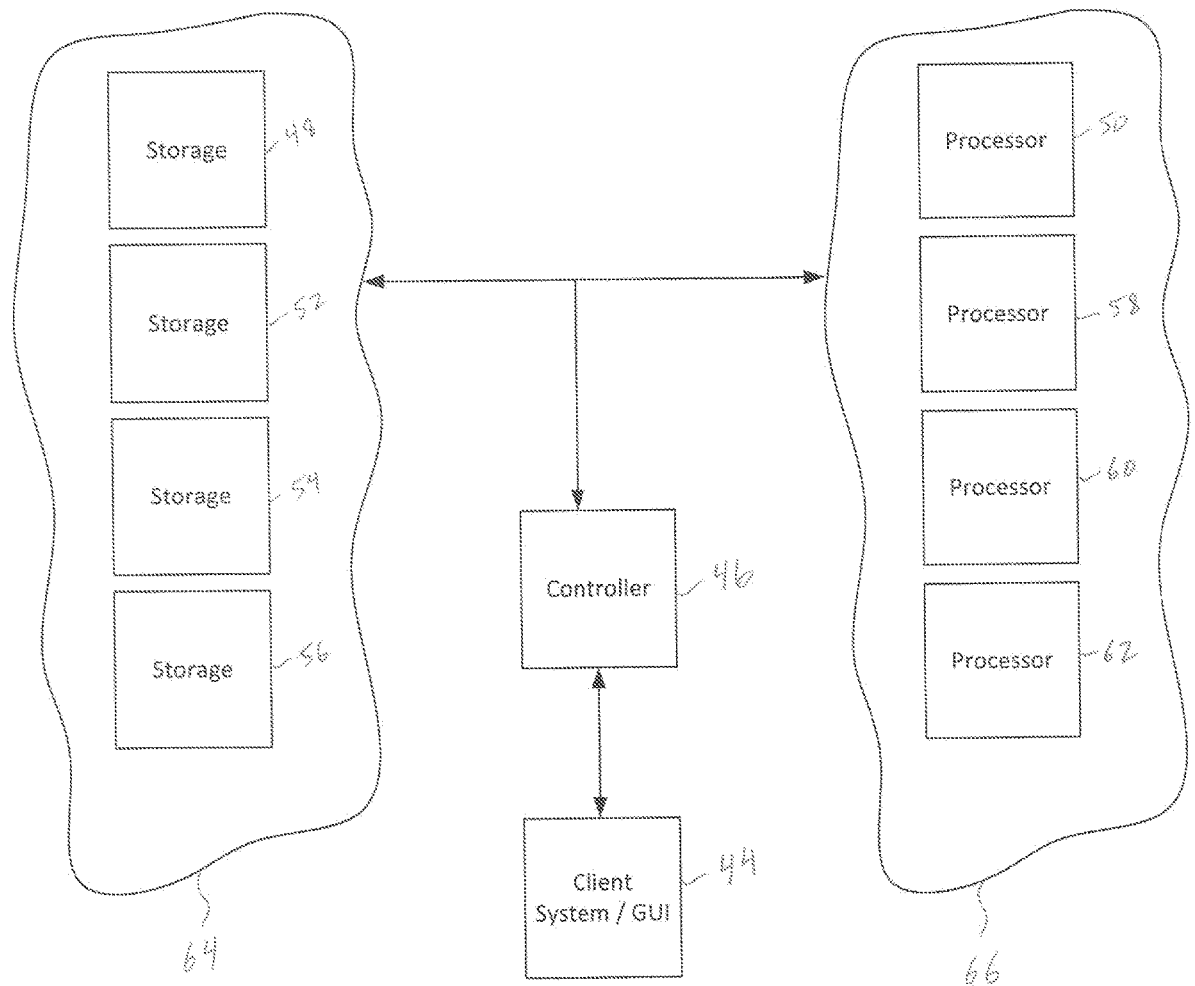
FIG. 9 depicts another embodiment of a processing/storage configuration that may be utilized by one or more users on client systems.
Figure 10:
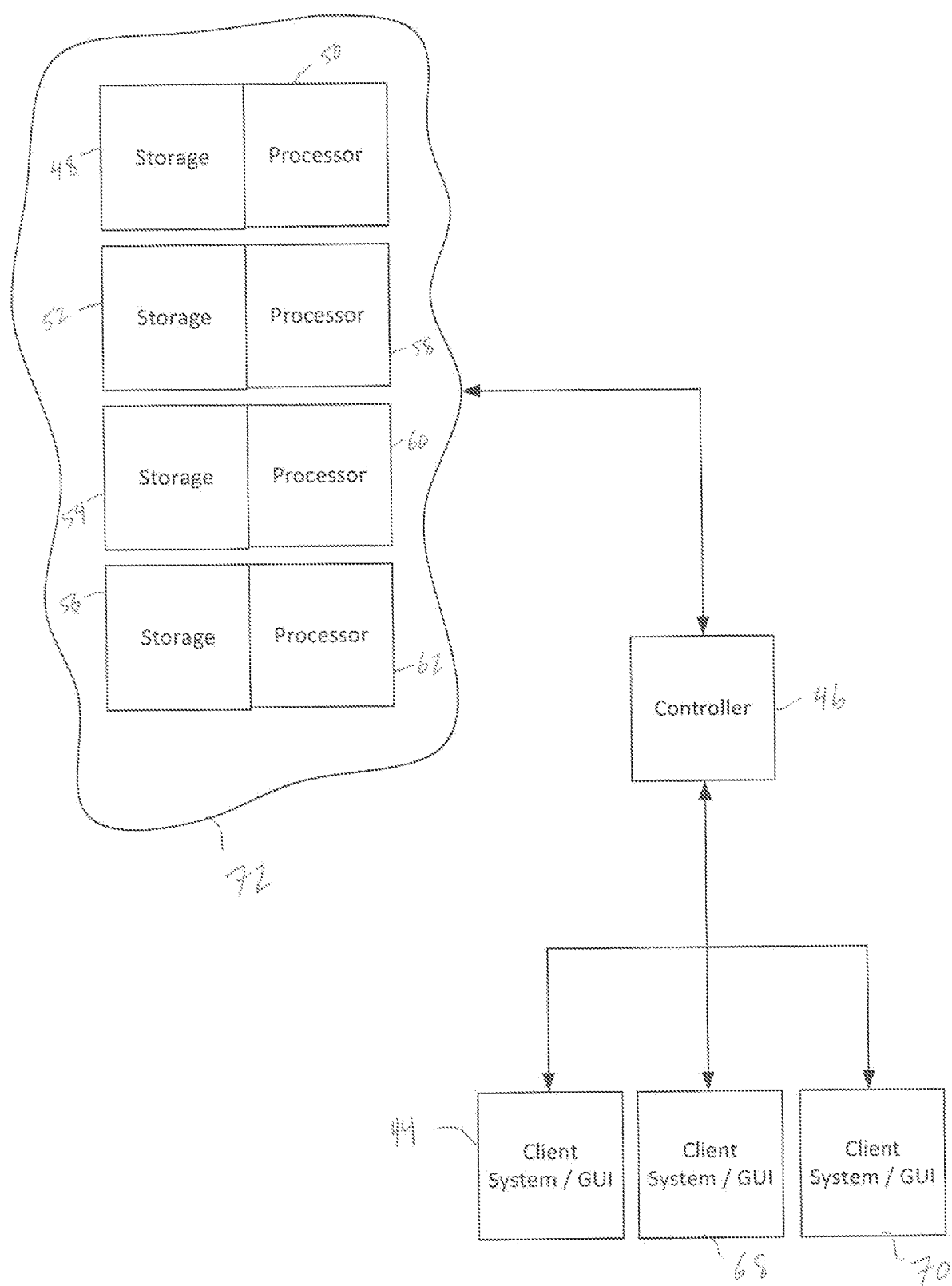
FIG. 10 depicts another embodiment of a processing/storage configuration that may be utilized by one or more users on client systems.
Figure 11:
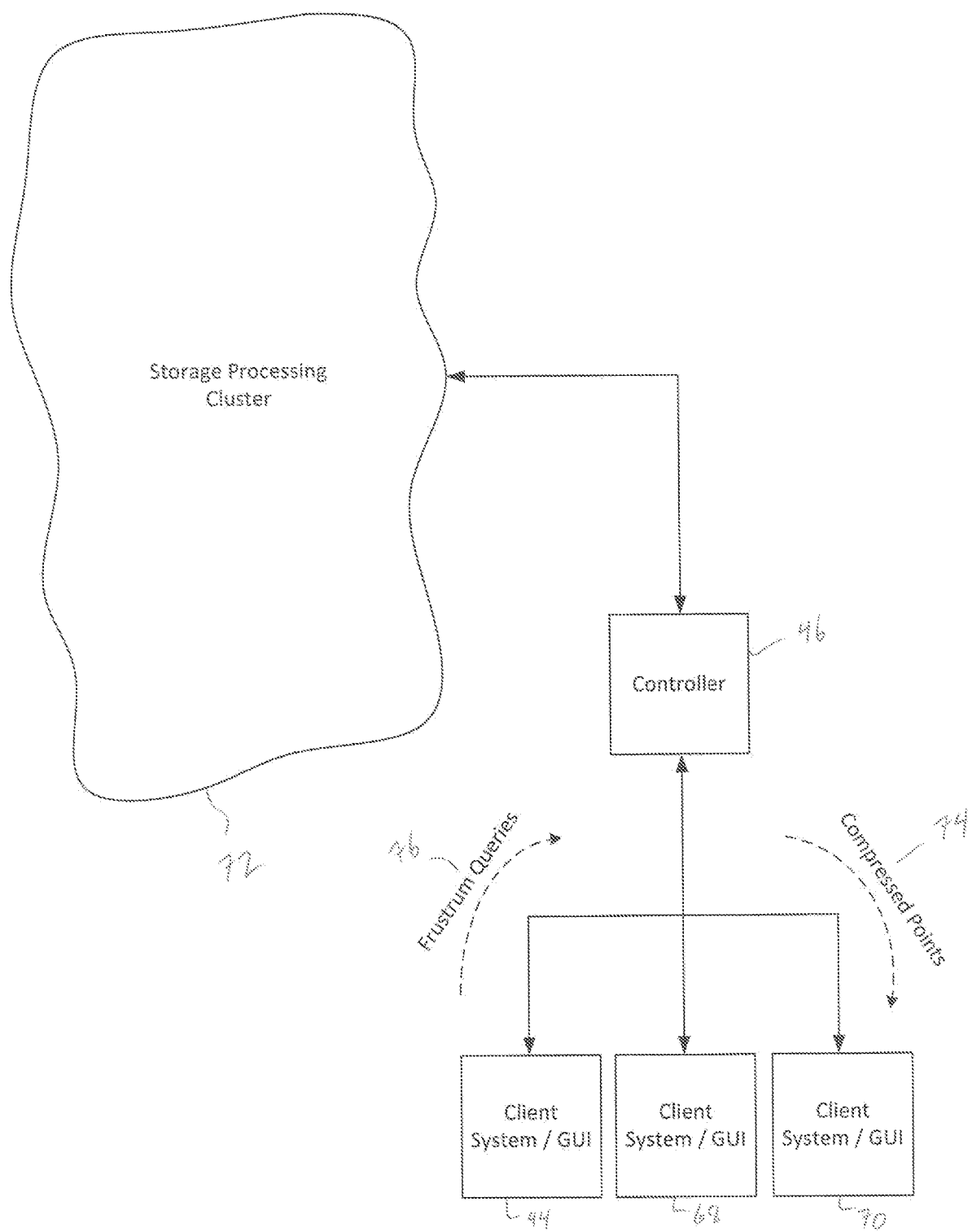
FIG. 11 depicts another embodiment of a processing/storage configuration that may be utilized by one or more users on client systems.

Referring to FIG. 7, in one embodiment, a user may operate a client system (44), such as a personal computer or smartphone, having a graphical user interface, to engage a controller (46) that is configured to coordinate the activities of a storage system (48) and a processor (50) to locate, retrieve, and assemble the correct data sectors for dispatch back to the client system (44), preferably in a form wherein they may be directed straight to the graphics processing unit ("GPU") of the client system (44) for rapid graphical processing (i.e., fast for graphics processing relative to conventionally processing all inbound data) into an image that may be displayed for the user on a display operatively coupled to, or comprising part of, the client system (44). Referring to FIG. 8, an embodiment is shown similar to that of FIG. 7, but wherein the storage and processor systems (48, 50) comprise portions of the same larger system, or are closely coupled, as in the same housing or same location, for I/O efficiency gains. The embodiments of FIGS. 7 and 8 are fairly elementary embodiments, and in other embodiments, parallelism of storage and/or processing may be utilized—particularly since the aforementioned data hierarchy schemas are well suited for such parallelism in that the data is very modular (i.e., in sectors) and the naming/access hierarchy may utilized to access and process data sectors that are spread across multiple platforms and/or locations. For example, referring to FIG. 9, a storage cluster (64) comprises multiple interconnected storage systems (48, 52, 54, 56). This storage cluster (64) may be operatively coupled to a processing cluster (66) comprising multiple interconnected processors or processing systems (50, 58, 60, 62). FIG. 10 illustrates another embodiment wherein storage and processing resources are grouped together into a storage/processing cluster (72), which may provide yet additional efficiencies. Also illustrated in FIG. 10 is the notion that multiple users, in the form of multiple client systems (44, 68, 70) may access and utilize the storage/processing cluster (72), such as through web browsing sessions on machines local to the users in a thin-client type of configuration subject to connectivity constraints—which, again, are facilitated by the configurations described above, wherein very large point data sets may be distributed and characterized into a large and accessible tree hierarchies wherein they may be stored and processed in sectors in massively parallel configurations remote to the users. Multiple users may use any of the configurations shown in FIGS. 7-9 in a similar manner. Referring to FIG. 11, in practice, the interaction between the client systems of the users (44, 68, 70) and the storage/processing cluster (72) may be simplified as one wherein frustrum queries (i.e., defining variables such as origin, vector, field of capture width/shape) go out (76) and compressed points (74), preferably in the form of portions of point clouds to be aggregated as hybrid or multi-resolution images on the client systems (44, 68, 70). The controller (46) may be coordinated using a software framework such as Apache Hadoop, which is specifically designed to enable applications to coordinate and function with thousands of nodes and up to petabytes of data. Caching may be utilized to provide fast retrieval of sectors commonly utilized during a particular process of group of processes—at the local client system processor level, the local client system GPU level, and on the storage system or cluster side as well.

Figure 12:
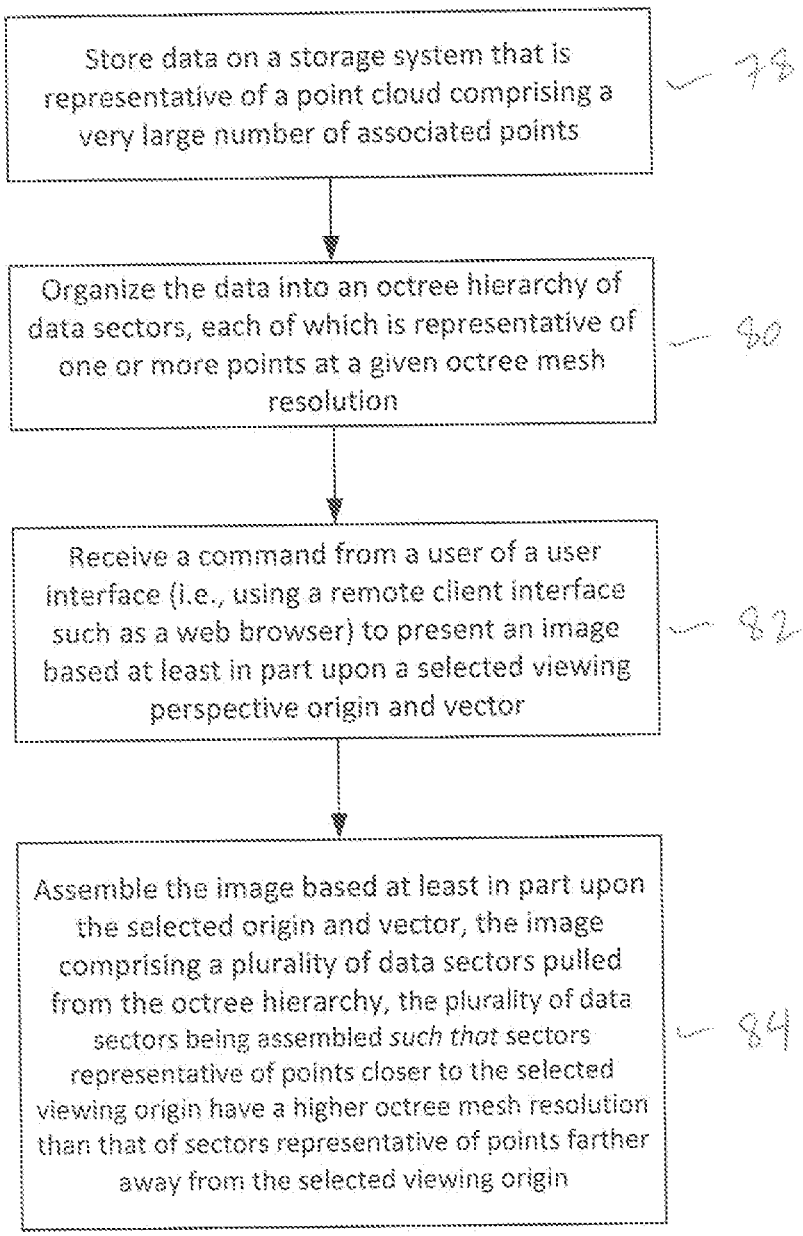
FIG. 12 depicts one configuration for assembling an image using an octree hierarchy.

Referring to FIG. 12, in one embodiment, data representative of a point cloud comprising a very large number of associated points may be stored on a storage system (78), preferably in a parallel storage distribution and processing configuration for rapid hierarchy building, processing, and retrieval capabilities. The data may be organized into an octree or other hierarchy of data sectors, each of which is representative of one or more points of a given mesh resolution (80). A command may be received from a user of a user interface to assemble and/or present an image based at least in part upon a selected viewing perspective origin and vector (82), and an image may be assembled based at least in part upon the selected origin and vector, the image comprising an aggregation of data sectors pulled from the tree hierarchy, the plurality of data sectors being assembled such that sectors representative of points closer to the selected viewing origin have a higher tree hierarchy mesh resolution than that of sectors representative of points farter away from the selected viewing origin (84).

Figure 13:
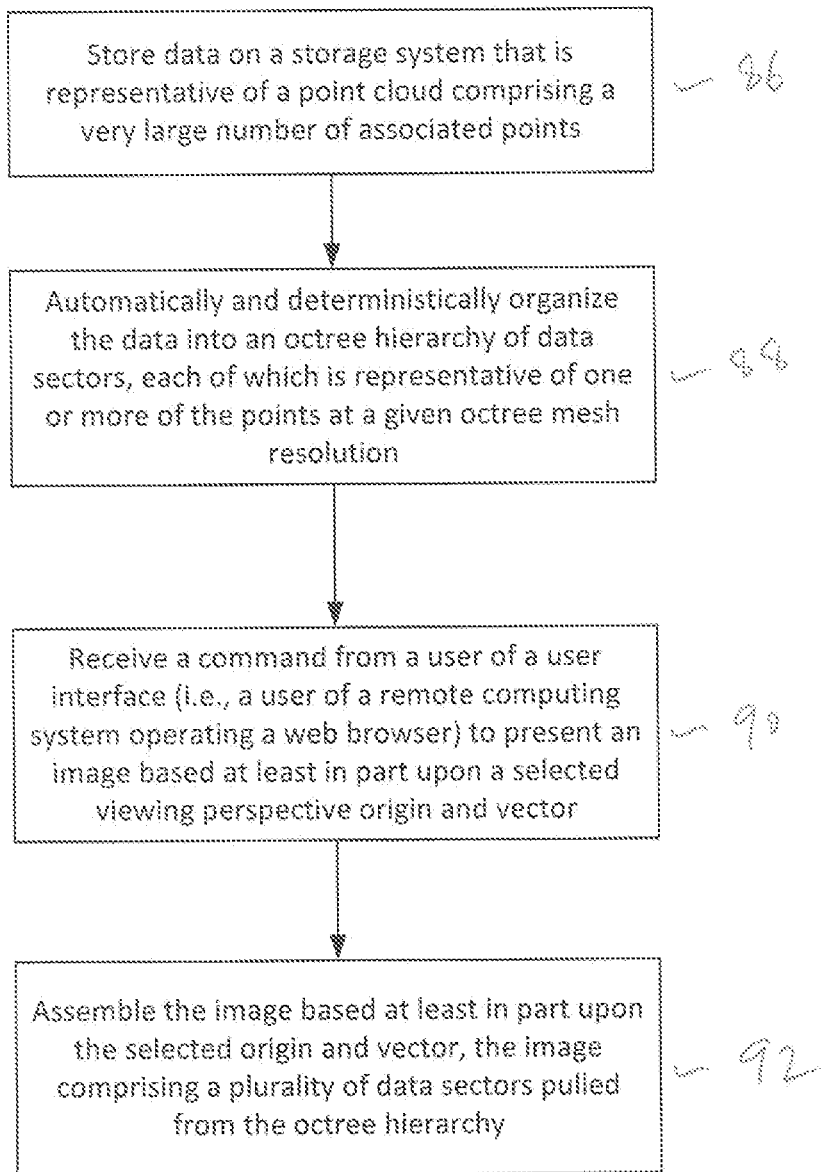
FIG. 13 depicts one configuration for assembling an image using an octree hierarchy.

Referring to FIG. 13, in another embodiment, data representative of a point cloud comprising a very large number of associated points may be stored on a storage system (86), preferably in a parallel storage distribution and processing configuration for rapid hierarchy building, processing, and retrieval capabilities. The data may be organized into an octree or other hierarchy of data sectors using an automatic and/or fully deterministic file creation and naming/referencing schema, each of the sectors being representative of one or more points of a given mesh resolution (88). A command may be received from a user of a user interface to assemble and/or present an image based at least in part upon a selected viewing perspective origin and vector (90), and an image may be assembled based at least in part upon the selected origin and vector, the image comprising an aggregation of data sectors pulled from the tree hierarchy (92).

Figure 14A:
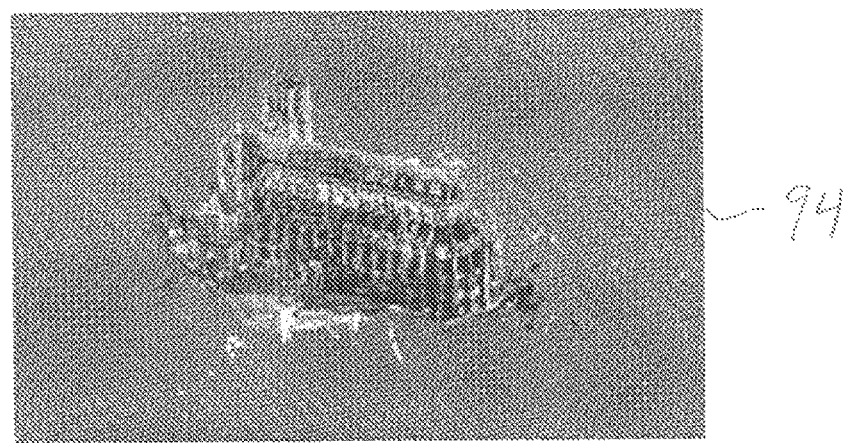
FIGS. 14A-14G illustrate various images of a structure assembled from a very large point cloud.
Figure 14B:
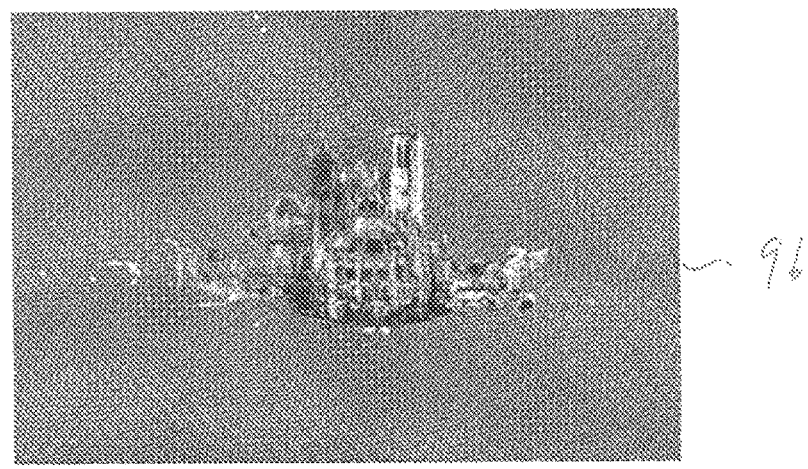
Figure 14C:
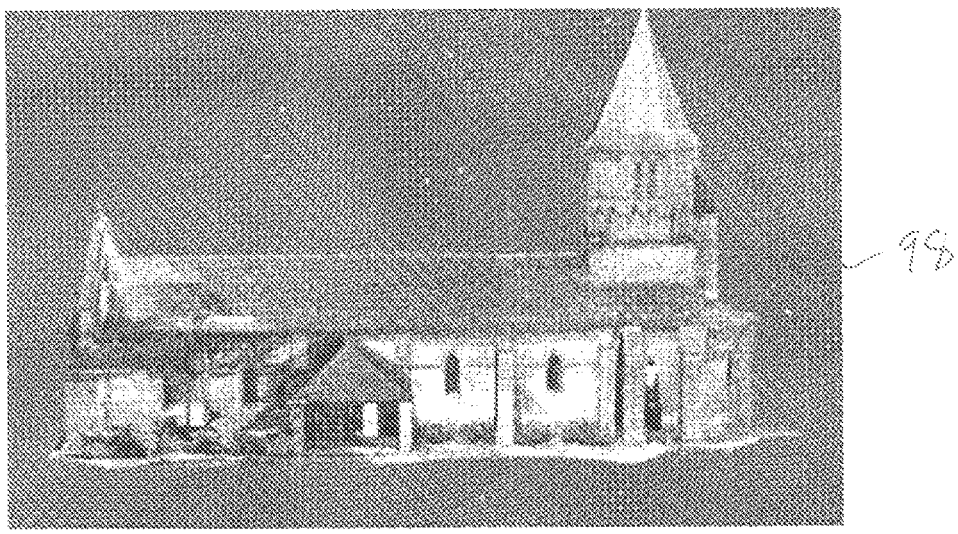
Figure 14D:
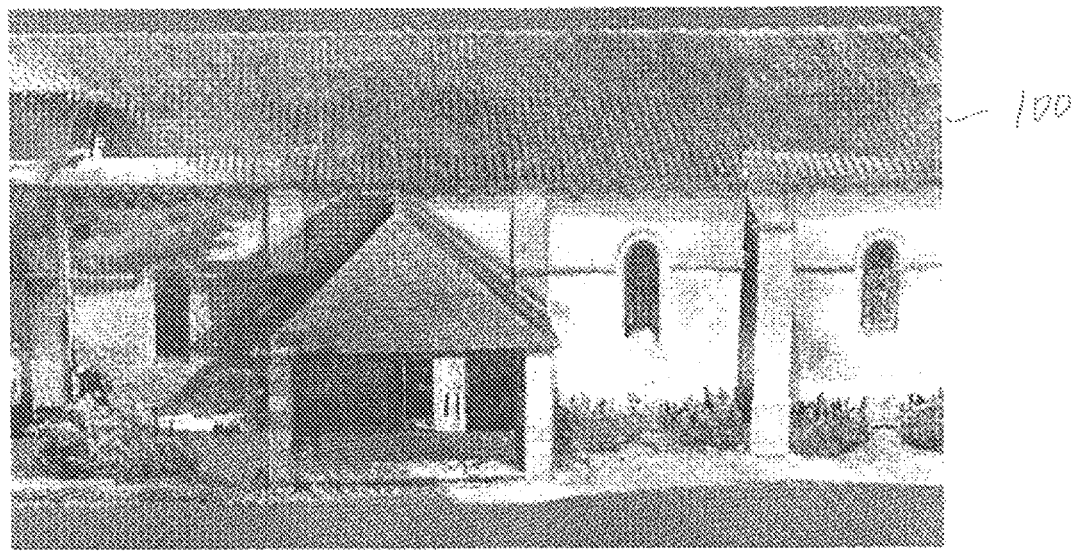
Figure 14E:
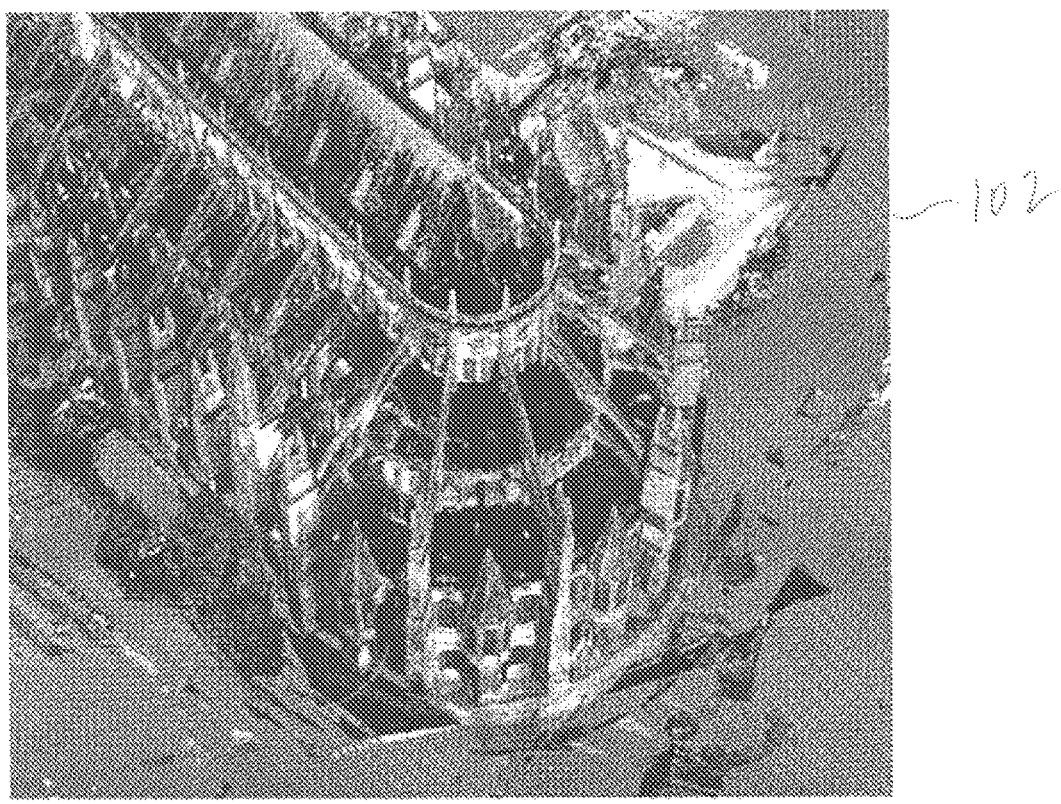
Figure 14F:
Figure 14G:
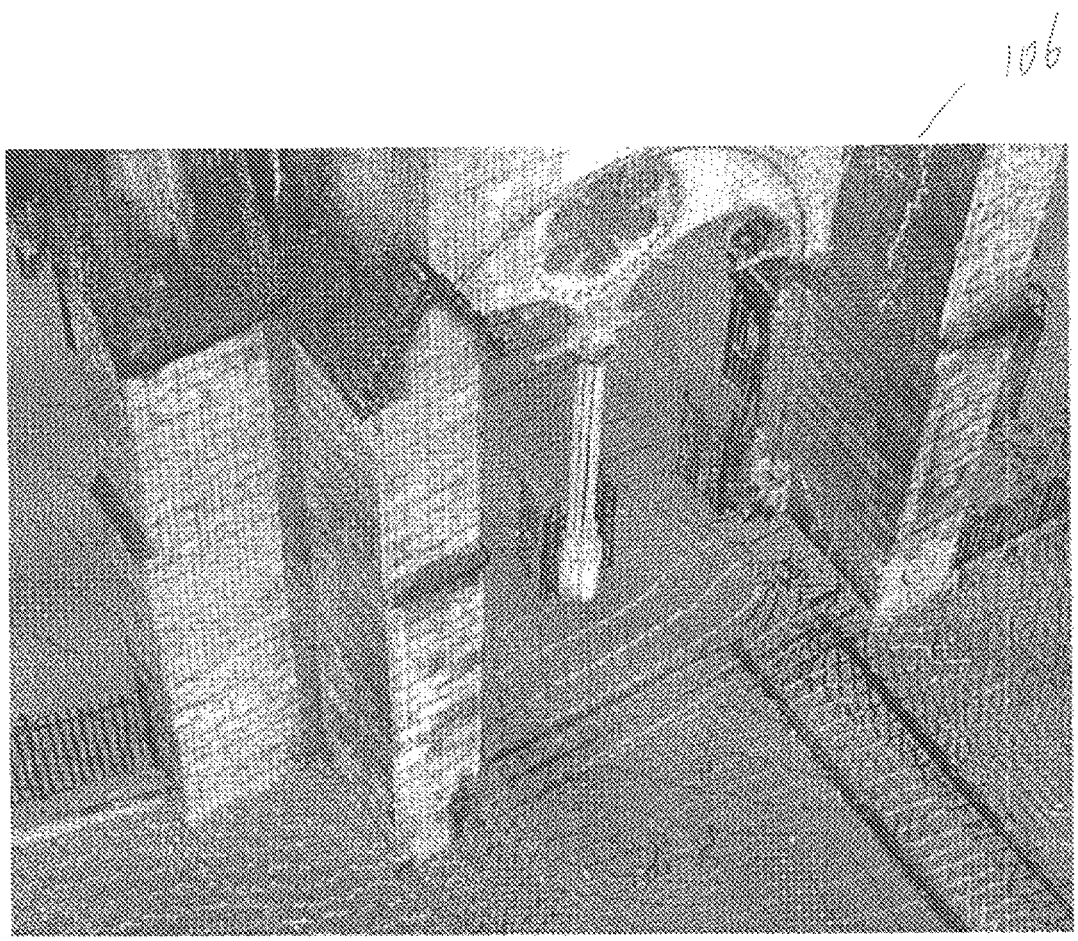
Figure 15A:
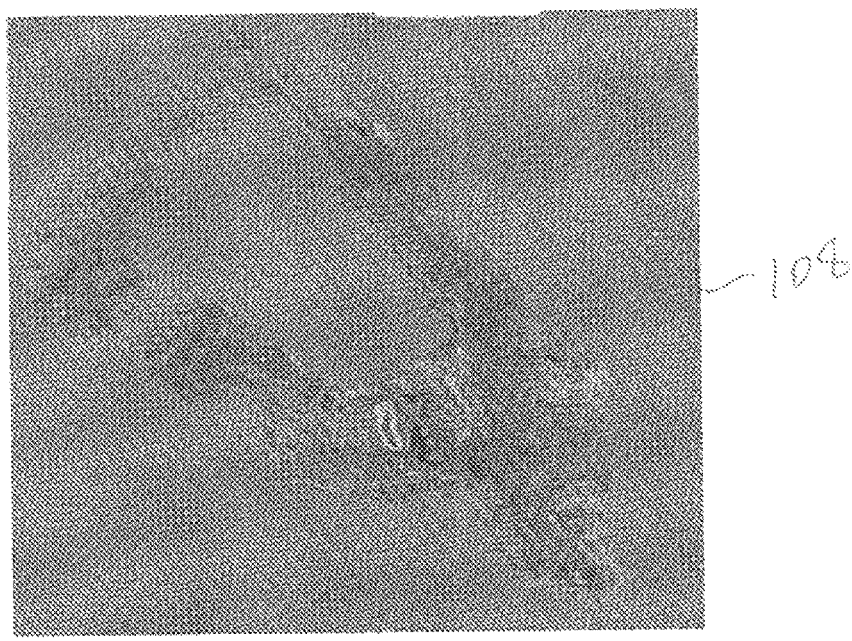
FIGS. 15A-15F illustrate various images of a structure assembled from a very large point cloud.
Figure 15B:
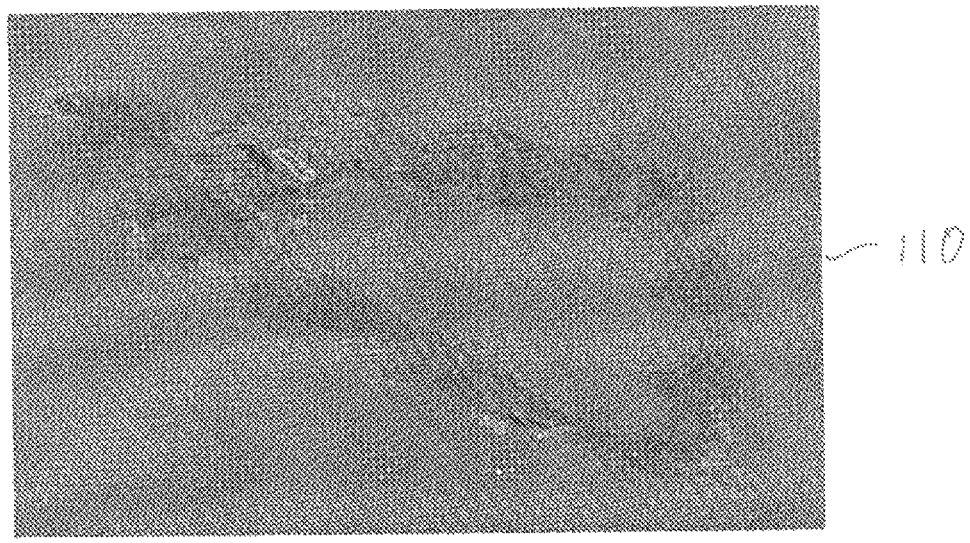
Figure 15C:
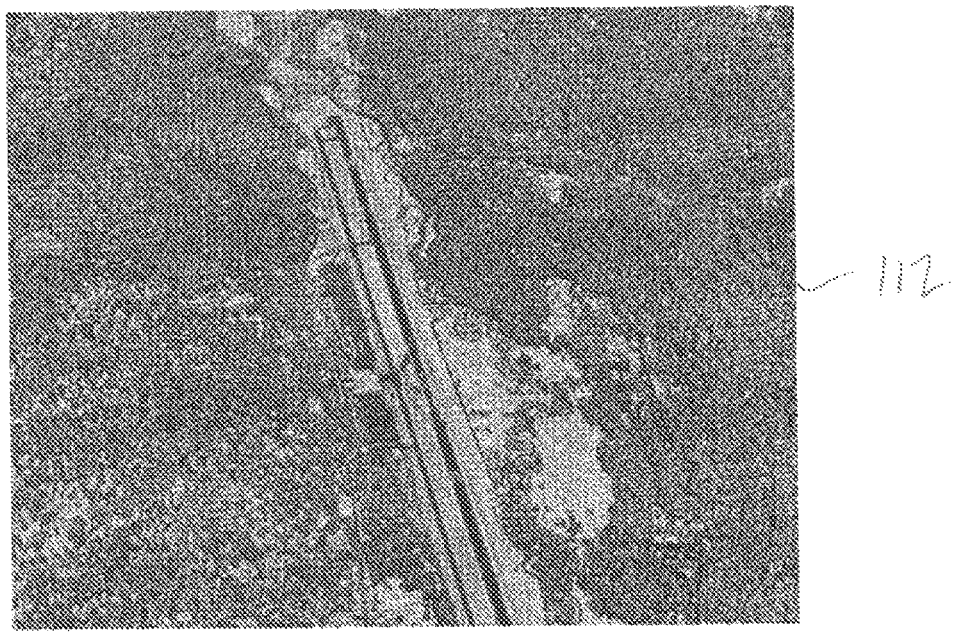
Figure 15D:
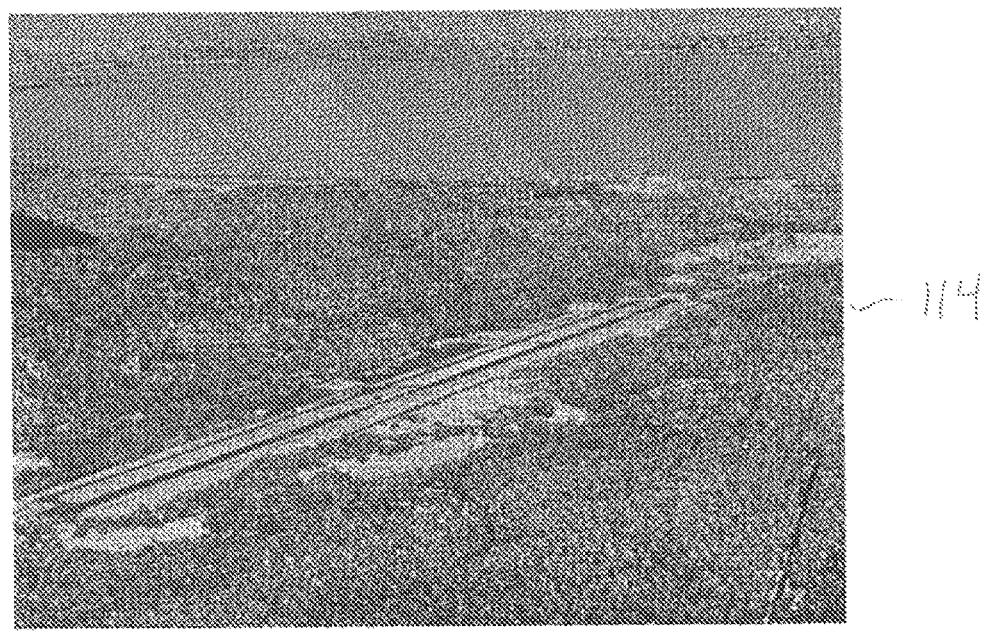
Figure 15E:
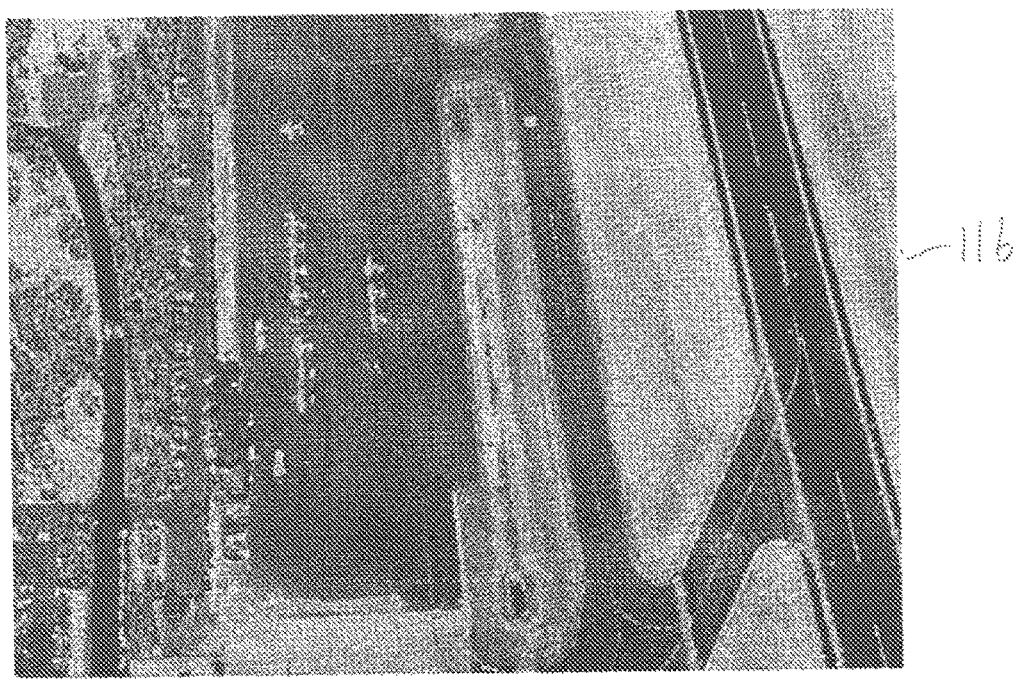
Figure 15F:
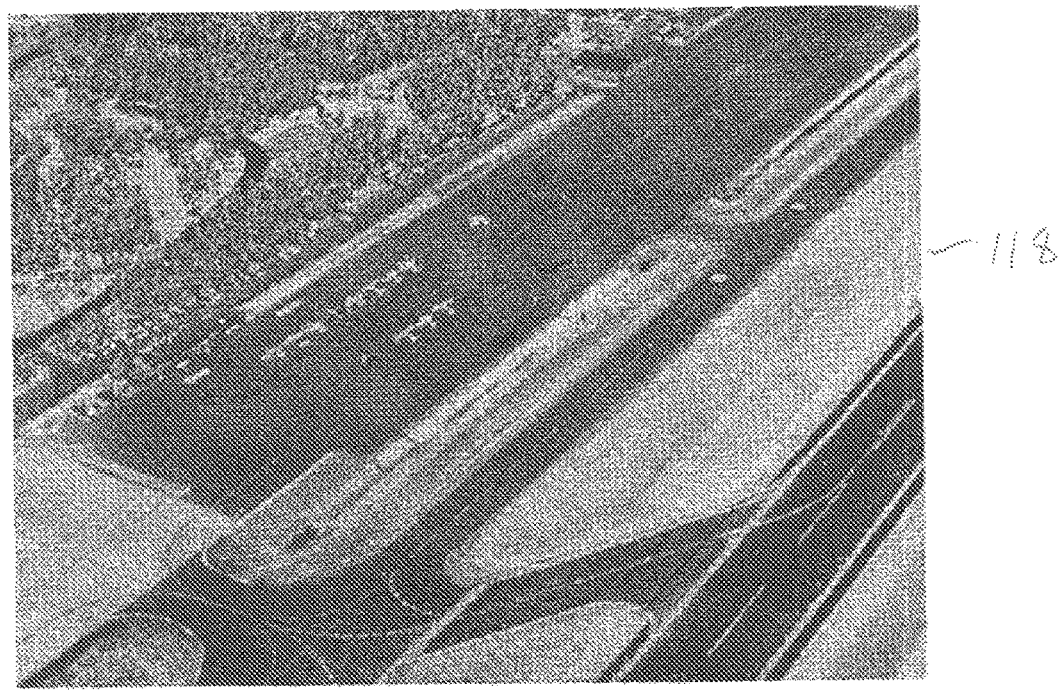
Figure 16A:
FIGS. 16A-16D illustrate various images of a structure assembled from a very large point cloud.
Figure 16B:
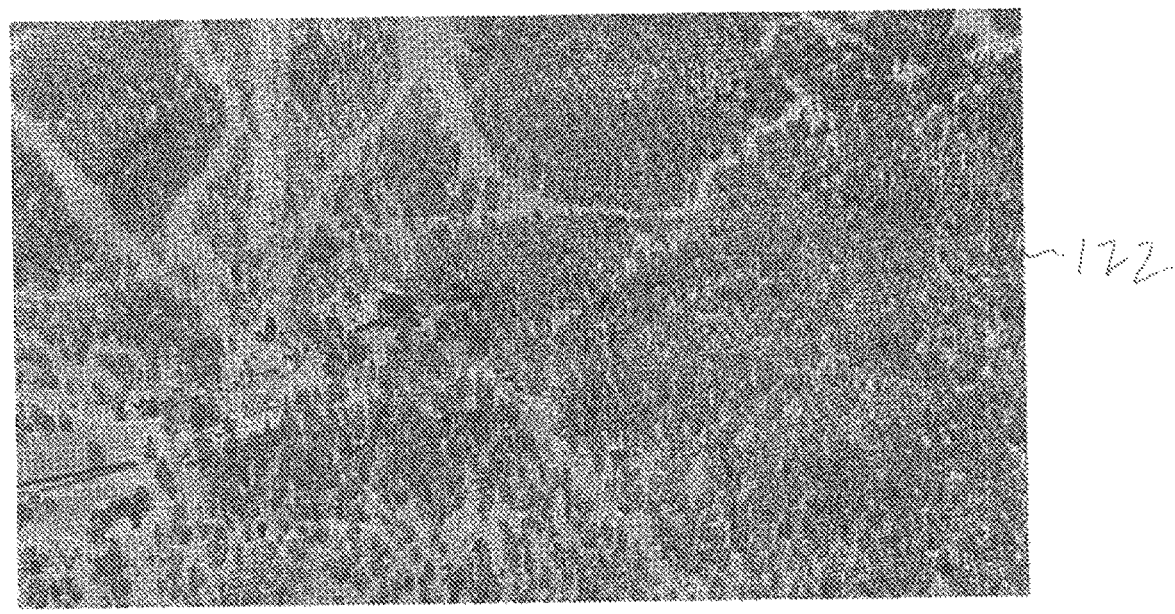
Figure 16C:
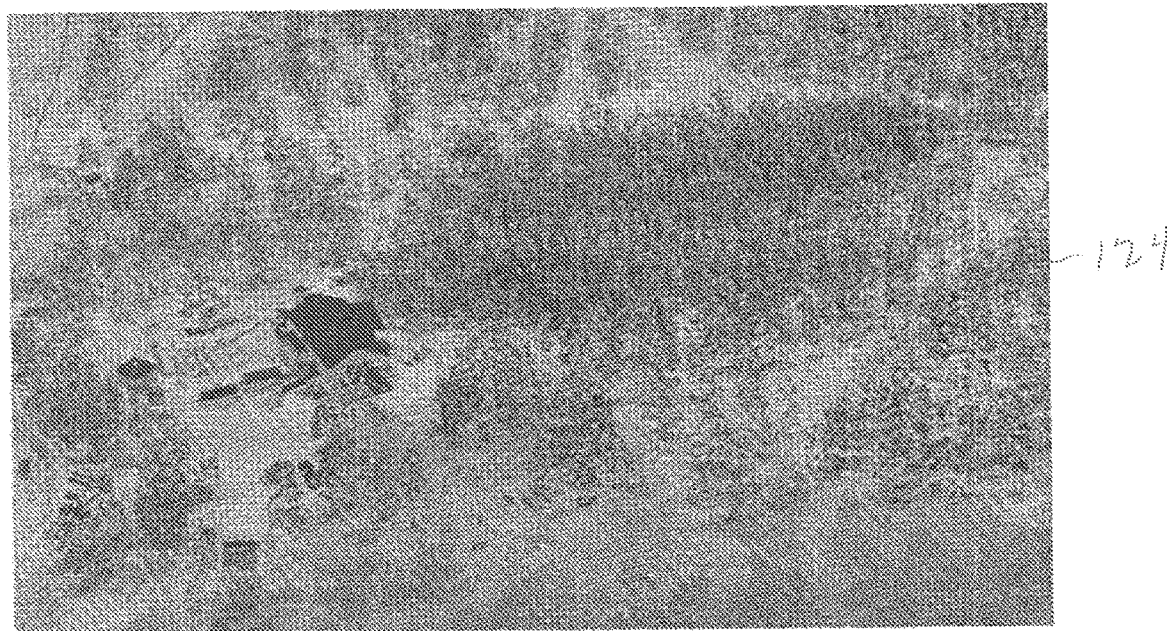
Figure 16D:
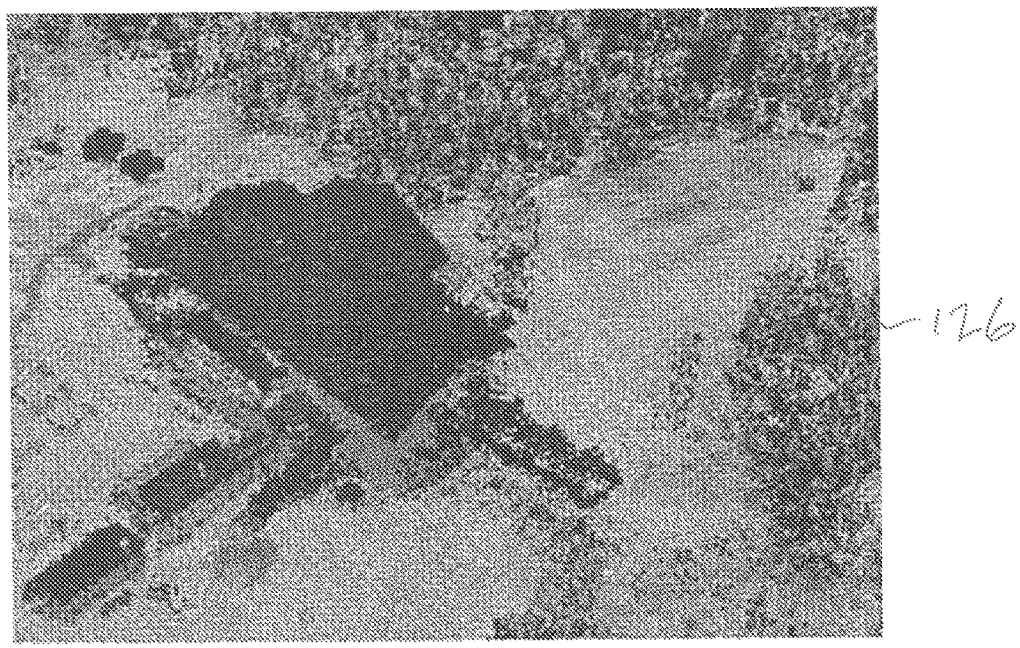

Referring to FIGS. 14A-14G, 15A-15F, and 16A-16D, some sample images created from parallelized octree hierarchy data trees are depicted for illustrative purposes. Referring to FIG. 14A, with an octree parallelized point cloud representative of a town that contains a large church, an operator may select origin, vector, and field capture variables to be presented with an aggregated image such as that (94) depicted, wherein data sectors pertinent to the side of the church not being illustrated are recruited and presented in lower resolution than those being directly presented given the selected origin, vector, and field capture variables. Referring to FIG. 14B, with a quick change of origin, vector, and field capture variables, a different aggregation of sectors is depicted as an image (96) to show a different view of the portion of the data cloud, with some similar sectors at the previous resolution that may be cached, and others that must be freshly recruited at an appropriate resolution given the origin, vector, and field capture variables. With successive changes in origin, vector, and field capture variables, as shown in the images of FIGS. 14C-14G (98, 100, 102, 104, 106) the controller preferably is configured to recruit, preferably from parallel resources, appropriate aggregations of data sectors to provide the requisite resolution and field of view per the user commands, and preferably with minimized latency in not only recruitment but also assembly (i.e., preferably as directly as possible to the local GPU). For example, the mesh resolution of the architecture depicted in the image of FIG. 14G (106) clearly is higher (i.e., tighter mesh/deeper down the data tree hierarchy) than the same structures as represented in the image of FIG. 14A (94), and, again, preferably the sectors not most immediately visible in the image aggregation are not at as high a mesh resolution as those that are most immediate.

Referring to FIGS. 15A-15F, starting far out from a cloud of points representative of the Lake Tahoe area of California and Nevada, origin, vector, and field capture variables may be adjusted to create a series of images (108, 110, 112, 114, 116, 118) with sequentially customized sector selection. With the efficiencies of parallel storage and processing, and caching, a user of a remote computing session, such as via a web browser, may "fly" or "travel" relatively seamlessly (and with a latency somewhat akin to that of a Google Earth type of experience, depending upon computing, storage, and connectivity resources) from a zoomed out position such as that depicted in the image of FIG. 15A (108) wherein details are barely visible, to a more zoomed-in position such as that depicted in FIG. 15F (118), wherein details of airplanes on a runway may be visualized. FIGS. 16A-16D depict similar sequential "zooming in" by use of different aggregations of data sectors pulled efficiently and assembled into the depicted images (120, 122, 124, 126).

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure. Any of the devices described for carrying out the subject diagnostic or interventional procedures may be provided in packaged combination for use in executing such interventions. These supply "kits" may further include instructions for use and be packaged in containers as commonly employed for such purposes.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events. Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed:

1. A method for presenting multi-resolution views of a point data set, comprising:
    storing data on a storage system that is representative of a point cloud comprising a number of associated points;
    storing a resolution gradient on the storage system;
    octree mesh resolution data sectors on the storage system;
    organizing the data into an octree hierarchy of data sectors, each of which is representative of one or more of the points at a given octree mesh resolution;
    retrieving the resolution gradient and the octree mesh resolution data sectors from the storage system;
    receiving a command from a user of a user interface to present an image based at least in part upon a viewing perspective origin of the frustum, a vector of the frustum originating at the origin of the frustum and a field of view of the frustum;
    assembling the image based at least in part upon the selected origin and vector originating at the origin, the image comprising a plurality of data sectors pulled from the octree hierarchy, the plurality of data sectors being assembled such that sectors representative of points closer to the selected viewing origin have a higher octree mesh resolution than that of sectors representative of points farther away from the selected viewing origin along the vector, wherein the image is based on the resolution gradient retrieved from the storage system and the resolution gradient is selected to form a first gradient with a descending resolution in a direction outward from the selected viewing perspective origin along the vector; and
    tuning, by an operator, the resolution gradient between at least two of (i) to have linear change in resolution from back to front, (ii) to be nonlinear and (iii) to be stepwise at certain distance thresholds.

2. The method of claim 1, wherein the resolution gradient has linear change in resolution from back to front.

3. The method of claim 1, wherein the resolution gradient is nonlinear change in resolution from back to front.

4. The method of claim 3, wherein the resolution gradient is stepwise at certain distance thresholds.

5. The method of claim 1, wherein the resolution gradient is tunable by an operator based upon at least one of (i) computing resources and (ii) bandwidth resources.

6. The method of claim 1, further comprising presenting the user interface to the user within a web browser.

7. The method of claim 1, wherein the user interface is configured such that the user may adjust the selected origin and vector using an input device, causing the controller to assemble a new image based at least in part upon the adjusted origin and vector.

8. The method of claim 1, wherein the number of associated points is greater than 1 billion points.

9. The method of claim 1, wherein the point cloud has a uniform point pitch.

10. The method of claim 1, wherein the point cloud has a point pitch that is less than about one meter.

11. The method of claim 10, wherein the point cloud has a point pitch that is less than about 1 centimeter.

12. The method of claim 1, wherein the point cloud represents data that has been collected based upon distance measurement scans of objects.

13. The method of claim 12, wherein the point cloud represents at least one LIDAR scan.

14. The method of claim 1, wherein the octree hierarchy of data sectors is configured such that an N level sector represents a centroid of points at the N+1 level below.

15. The method of claim 14, wherein each point is weighted equally in determining the centroid.

16. The method of claim 14, wherein the points comprising the point cloud are not all weighted equally in determining the centroid.

17. The method of claim 1, further comprising using the controller to store data sectors of similar octree mesh resolution in similar accessibility configurations on the storage system.

18. The method of claim 17, wherein the controller is configured to store data sectors of similar octree mesh resolution on a common storage device.

19. The method of claim 1, wherein the data sectors have different mesh resolution levels wherein data sectors of similar octree mesh resolution are stored such that they have similar retrieval latencies from the storage system and wherein data sectors of different octree mesh resolution are stored such that they have different retrieval latencies from the storage system.

* * * * *